(12) United States Patent
Yoshida

(10) Patent No.: US 6,313,907 B1
(45) Date of Patent: Nov. 6, 2001

(54) DISTANCE MEASUREMENT SYSTEM

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/401,828

(22) Filed: Sep. 22, 1999

(30) Foreign Application Priority Data

Sep. 28, 1998 (JP) .................................................. 10-273103

(51) Int. Cl.[7] .............................. G01C 3/08; G03B 13/00
(52) U.S. Cl. ......................... 356/4.03; 396/106; 396/120
(58) Field of Search ........................... 356/4.03; 396/106, 396/120

(56) References Cited

U.S. PATENT DOCUMENTS

| | | | |
|---|---|---|---|
| 5,493,362 | * | 2/1996 | Nonaka . |
| 5,659,387 | | 8/1997 | Yoshida . |
| 5,832,324 | * | 11/1998 | Shimizu et al. ..................... 396/106 |
| 6,173,123 | * | 1/2001 | Yoshida ................................ 396/106 |

* cited by examiner

Primary Examiner—Stephen C. Buczinski
(74) Attorney, Agent, or Firm—Leydig, Voit & Mayer, Ltd

(57) ABSTRACT

In a distance measurement system, an integrating capacitor is preliminarily charged to at least a reference voltage $V_{REF}$ upon main power source power-on (a first predetermined period). When a shutter release button is half depressed to start a distance measurement (second predetermined period), the integrating capacitor is also preliminarily charged. At the end of the preliminarily charging in the first predetermined period, a drop in voltage occurs in the integrating capacitor due to dielectric absorption. However, by subsequently preliminarily charging at the start of the distance measurement (second predetermined period), a voltage drop in the integrating capacitor due to the dielectric absorption can be prevented. This second charging contributes to the prevention of error. Especially, if the first predetermined period is longer than the second one, the time required for the preliminarily charging at the start of the distance measurement can be further reduced.

5 Claims, 6 Drawing Sheets

DISTANCE MEASUREMENT SYSTEM

BACKGROUND OF THE INVENTION

1. Field of the Invention

The present invention relates to a system for measuring a distance to an object to be measured and more particularly to an active distance measurement system favorably applied to various types of cameras.

2. Related Background Art

Such an active distance measurement system applied to cameras generally includes an infrared-emitting diode (IRED) for emitting an infrared beam toward an object to be measured, and a position sensitive detector (PSD) for receiving the object-reflected infrared beam. The signal output from the PSD is a signal responsive to a position where the object-reflected infrared beam is received. A signal processing and arithmetic unit determines a distance to the object to be measured from this signal. Because a large error may occur at once measurement, averaging of multiple pieces of distance information is generally performed to obtain more accurate distance information.

FIG. 4 shows a circuit diagram illustrating a configuration of an integrating unit used for obtaining the average of the distance information in the distance measurement system. This integrating unit 16 comprises a switch 1, an integrating capacitor 2, a switch 3, a constant current source 4, an operational amplifier 5, a switch 6, a reference power source 7, and a comparator 8. The negative input terminal of the operational amplifier 5 is connected through the switch 1 to the output terminal of an arithmetic unit 15 and grounded through the integrating capacitor 2. Furthermore the negative input terminal of the operational amplifier 5 is connected through the switch 3 to the constant current source 4, and connected through the switch 6 to the output terminal of the operational amplifier 5. Also, the positive input terminal of the operational amplifier 5 is connected to the reference power source 7, which provides a reference voltage $V_{REF}$. The comparator 8 is connected to the junction between the negative terminal of the operational amplifier 5 and the integrating capacitor 2 and compares the potential of the junction and the reference voltage $V_{REF}$ to find out which is higher. The comparator 8 outputs a signal corresponding to the comparison results. A central processing unit (CPU) 19 receives the signal output from the comparator 8 and controls the on-off operation of the switches 1, 3 and 6.

As an example of the distance measurement system using such an integrating unit 16 is a distance measurement system mounted in a camera. When a shutter release button is half- or partially-depressed after powering on the camera, the CPU 19 turns on the switch 6 to charge the integrating capacitor 2. As the result, the integrating capacitor 2 is charged, as generally shown in FIG. 5, to the reference voltage $V_{REF}$ provided by the reference power source 7. After the charging up, the switch 6 is turned off and retained in such a state.

Then, the IRED emits infrared pulses and the switch 1 is turned on. As a result, output signals (distance information) from the arithmetic unit 15 are input into the integrating capacitor 2 as negative voltages. AS shown in FIG. 5, the voltage across the integrating capacitor 2 decrementally changes step by step in value corresponding to each distance measurement information. This is called a "first integrating".

After the predetermined number (e.g., 256) of negative voltage inputs (discharges) into the integrating capacitor 2 are completed, the switch 1 is turned off and the switch 3 is turned on in response to control signals from the CPU, whereby the integrating capacitor 2 is charged at a fixed speed defined by the power rating of the constant current source 4. This is called a "second integrating".

All the while of the second integrating, the comparator 8 compares the voltage level of the integrating capacitor 2 and the reference voltage $V_{REF}$. If the comparator 8 estimates that they are coincident with each other then the comparator 8 turns the switch 3 off to stop charging the integrating capacitor 2, i.e. finish the second integrating. The CPU 19 counts a charging time of capacitor 2 (length of time spent in the second integrating). As the charging speed by the constant current source 4 is uniform, the sum of the signal voltages input into the integrating capacitor 2 during the first integrating can be determined from the aforementioned charging time of capacitor 2. The distance to the object can be determined based on the resultant sum. On the basis of the obtained distance to the object, the CPU 19 controls a driving of lens to focus. In the subsequent distance measurement, as the required charging of the integrating capacitor 2 has been realized by the constant current source 4, the switch 3 may be retained open, unless the constant current source 4 is provided in use for a long time.

SUMMARY OF THE INVENTION

In the active distance measurement system as explained above, it is desired to use a low-cost ceramic condenser as an integrating capacitor for the integrating unit 16 because of the requirements for decreasing the cost of manufacturing. However, the ceramic condenser encounters the problem of a drop in charged voltage due to dielectric absorption. That is, the capacitor 2 forms an equivalent circuit shown in FIG. 6 immediately after the start of the first charging. Because of this, when a switch SW is turned off after the first charging, the voltage drop due to a resistance element Rx in FIG. 6 may be observed. Such a phenomenon is called "dielectric absorption".

Because of such a dielectric absorption occurring by using a ceramic condenser as the integrating capacitor 2, a relatively large voltage drop $\Delta V$ occurs as shown in FIG. 5 when the switch 6 is opened in the first distance measurement, and then the first integrating starts. Therefore, a time delay $\Delta t$ corresponding to the voltage drop $\Delta V$ is caused in a length of time required to charge in the second integrating. This time delay $\Delta t$ results in an error in distance measurement. It is noted that although a film condenser causes a voltage drop due to dielectric absorption, an amount thereof is very little so that: substantially no influence is exerted on the distance measurement. However, not only its cost of manufacturing is too high, but also it is rather bulky. This requires a large mounting space, preventing the system from being small sized.

As a distance measurement system solving such problems, a system is known, which is disclosed in Japanese Laid-Open Patent Publication No. 8-110222. In the distance measurement system disclosed in the above publication, after the main power is supplied and before the first distance measurement starts, an integrating capacitor is preliminarily charged for a predetermined period so that the voltage drop due to the dielectric absorption forcedly occurs in the integrating capacitor. This prevents the occurrence of the voltage drop in the integrating capacitor due to dielectric absorption during the first distance measurement. Otherwise, in the first distance measurement after the main power is supplied, the integrating capacitor may be charged for a sufficient length of time to prevent the occurrence of the voltage drop due to the dielectric absorption. In this manner, no voltage drop develops due to the dielectric absorption in the distance measurement, so that the occurrence of the distance measurement error can be evaded.

However, even with the distance measurement system disclosed in the above publication, the integrating capacitor drops in voltage level in the case where the distance measurement does not start for a considerable lapse of time after the main power source is powered on and in the case of a standby mode where a supply of power is stopped when no manipulation is carried out for a certain period. Thus, a distance measurement error due to the dielectric absorption of the integrating capacitor may occur in the subsequent distance measurement.

In order to solve the above-mentioned problems, it is an object of the present invention to provide a distance measurement system, which can measure a distance with high accuracy even if the distance measurement is not carried out for a considerable period and even in the case of the distance measurement after the release from the standby mode.

To achieve this object, the present invention provides an active distance measurement comprising: (1) a light source for emitting a predetermined series of light pulses toward the object to be measured; (2) a PSD for receiving object-reflected light pulses and outputting signals each corresponding to the position where the object-reflected pulse is received; (3) an arithmetic unit for outputting signals each corresponding to the distance to the object in response to signals output from said position sensitive detector; (4) an integrating capacitor set to a first reference voltage before emitting said series of light pulses, said capacitor being charged or discharged in response to said signals output from said arithmetic unit; (5) a distance detection unit for detecting the distance to the object based on a voltage of said capacitor present after emitting said series of light pulses; and (6) a charger or discharger for charging or discharging said integrating capacitor to said reference voltage or higher not only in a first predetermined period except the distance measuring operation, but also in a second predetermined period within the distance measuring operation and before the charging or discharging period of said integrating capacitor.

With the distance measurement system according to the present invention, the integrating capacitor is charged or discharged by the charger or discharger to the reference voltage or higher in the first predetermined period except a series of distance measuring procedures. When the distance measuring operation starts and in the second predetermined period, the integrating capacitor is charged or discharged to the reference voltage or higher. After such a charging (discharging) of the integrating capacitor, the pulses are emitted toward the object to be measured. The PSD receives each object-reflected pulse. The light-receiving position where the object-reflected pulse is received changes responsive to the distance to the object. The PSD outputs a signal dependent on this light-receiving position, it is possible to determine or calculate the light-receiving position and by extension the distance to the object based on thus output signal. The arithmetic unit issues the distance signals each representative of the distance to the object through the use of the above relation. The integrating capacitor integrates the distance signals and the distance detection unit can determine, based on the results of the integration, the average value of distance-calculation results for the corresponding pulse. Because the charging of the integrating capacitor is repeated twice, i.e. performed in the first and second predetermined period as explained above, the voltage drop due to the dielectric absorption forcedly occurs by the charging in the first predetermined period and the charging in the second predetermined period can compensates for the voltage drop. Thus, it is possible to restrain an error in distance measurement.

The first predetermined period is preferably a period after the main power source power-on. The distance measurement system may further include the power control unit operating to stop the power supply and set in the standby mode-if no manipulation is performed within a certain period, and to restart the power supply and release the standby mode if any manipulation is performed in the standby mode. In this case, the first predetermined period preferably includes the period after the release of the standby mode. Furthermore, the distance measurement system according to the present invention may be mounted in camera and the first predetermined period includes the period during which a component except the release button of the camera is manipulated (for example, zooming in and out, setting of date and so on, and checking of battery, etc.). In any case, the first predetermined period may be set to a sufficient length of time so that the voltage drop due to dielectric absorption in the integrating capacitor can be decreased by the charging in the first predetermined period.

The first predetermined period may be longer than the second one. In this case, as the charging in the first predetermined period causes only little voltage drop to occur in the integrating capacitor due to the dielectric absorption, the voltage drop in the integrating capacitor due to the dielectric absorption can be effectively prevented by the charging in the second predetermined period, even if the second predetermined period is relatively short.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
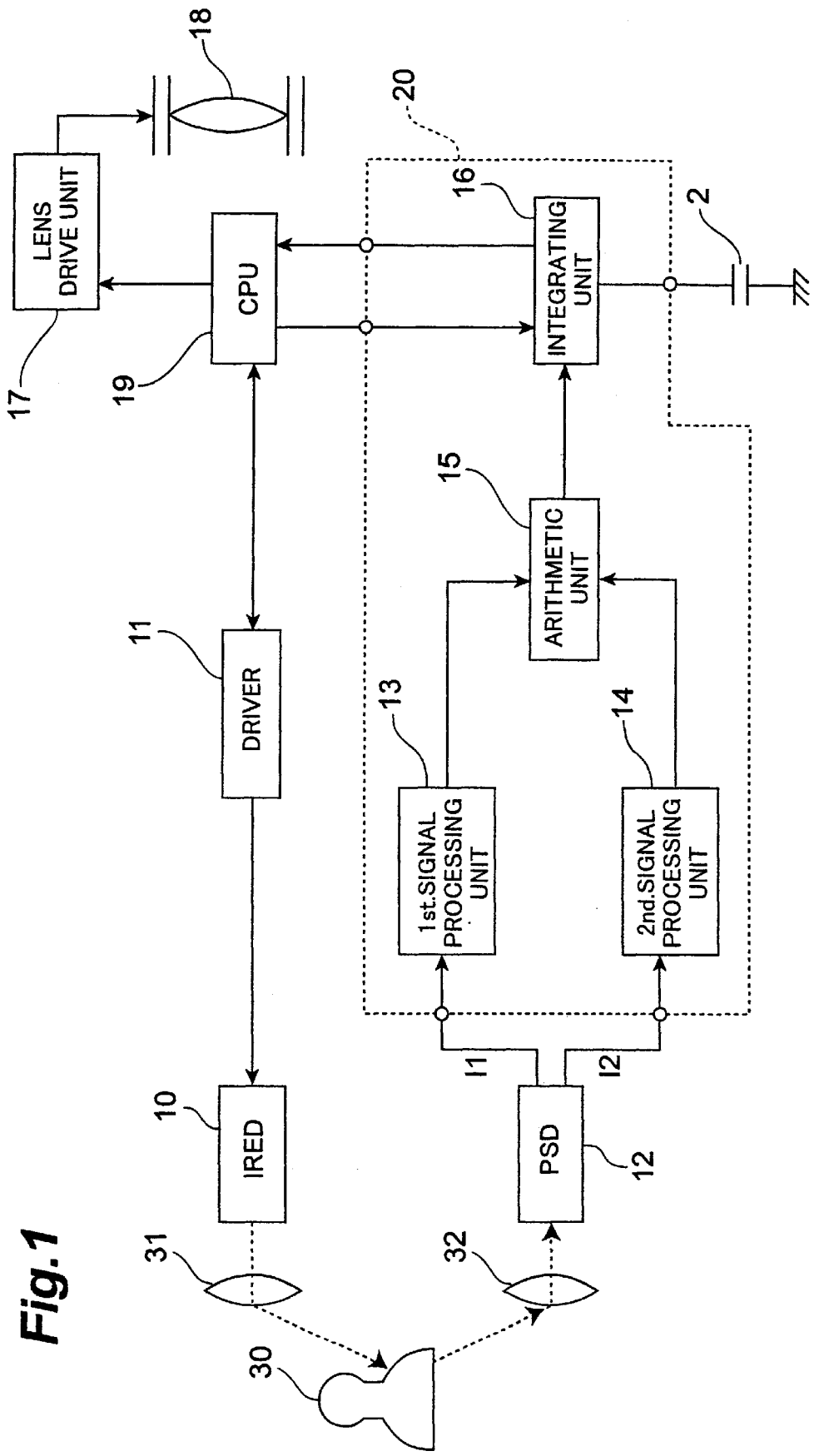
FIG. 1 is a block diagram of a distance measurement system according to a preferred embodiment of the present invention.

The embodiments according to the present invention will now be described in more detail with the accompanying drawings. To facilitate the comprehension of the explanation, the same reference numerals denote the same parts, where possible, throughout the drawings, and a repeated explanation will be omitted. Although the embodiments according to the present invention are described below regarding active distance measurement systems applied as those for using in automatic focussing cameras, the invention is certainly not limited thereto.

FIG. 1 is a block diagram of the distance measurement system according to the embodiment. The distance measurement system comprises an infrared-emitting diode (IRED) 10 for emitting infrared radiation through a light-projecting lens 31 to an object 30, a driver 11 for driving the IRED 10, and a position sensitive detector (PSD) 12 receiving through a light-receiving lens 32 the infrared radiation emitted by the IRED 10 and reflected by the object 30.

The distance measurement system further comprises first and second signal processing units 13 and 14 for processing, respectively, signal currents $I_1$, and $I_2$ output from the PSD 12, an arithmetic unit 15 for calculating distance information of the object 30 based on the signals output from these signal processing units 13 and 14, an integrating unit 16 for integrating the distance information signal output by the arithmetic unit 15, a lens 18 for producing an image of the object 30 on an imaging film, a lens drive unit 17 for driving the lens 18 to achieve proper focus to the object 30, and a central processing unit (CPU) 19 for controlling the whole of a camera including the above distance measurement system therein. In addition, it is noted that the first signal processing unit 13, the second signal processing unit 14, the arithmetic unit 15, the integrating unit 16 and the charging circuit 21 are installed in an autofocus integrated circuit (AFIC) 20 which mounted on the camera.

The CPU 19 controls the operation of camera containing this distance measurement system based on programs and parameters preliminarily stored in a memory (not shown), such as an electrically erasable and programmable read-only memory (EEPROM). In the distance measurement system shown in this figure, the CPU 19 controls the driver 11 to bring the infrared output of the IRED 10 under control and receives a signal representative of a power source voltage (for example, a power source voltage applied to the driver 11). Furthermore, the CPU 19 controls the operation of the AFIC 20 and receives the signal output from the AFIC 20 to determine the distance to the object 30 based on the above signals.

Under the control of the CPU 19, the IRED 10 first emits infrared radiation through the light-projecting lens 31 toward the object 30. This infrared radiation is reflected by the object 30 and the PSD 12 receives the reflected infrared radiation through the light-receiving lens 32. The PSD 12 outputs the signal currents $I_1$ and $I_2$ in response to the positions where the reflected infrared radiation is received. The first signal processing unit 13 receives the signal current $I_1$ output from the PSD 12 and the second signal processing unit 14 receives the signal current $I_2$ output from the PSD 12, each unit processes such as removal of a standing-light component. The arithmetic unit 15 accepts the output signals from the first and second signal processing units 13 and 14, and output a distance information signal corresponding to output ratio $I_1/(I_1+I_2)$ of the PSD 12.

During one distance measurement operation, the IRED 10 emits a predetermined number (for example, 256) of infrared light pulses and the arithmetic unit 15 issues the distance information signals each corresponding to the pulse. Thus, the integrating unit 16 performs the integrating process of the distance information signals as many as pulses and outputs the integrating result to the CPU 19. The CPU 19 determines a distance to the object 30 based on the integrating result and controls the lens drive unit 17 so as to drive the lens 18 for precious focus.

The details of the integrating unit 16 will be explained below. The integrating unit 16 in the preferred embodiment includes a ceramic condenser as an integrating capacitor 2, which is attached external to the AFIC 20. As the integrating unit 16 used in the present embodiment may be substantially consistent with that of the prior art, it will be explained with reference to FIG. 4. The integrating unit 16 comprises a switch 1, a switch 3, a constant current source 4, an operational amplifier 5, a switch 6, a reference power supply 7, and a comparator 8, in addition to the above integrating capacitor 2. The negative terminal of the operational amplifier 5 is connected through the switch 1 to the output terminal of the arithmetic unit 15 and grounded through the integrating capacitor 2. Also, the negative terminal of the amplifier is connected through the switch 3 to the constant current source 4, and through the switch 6 to the output terminal of the operational amplifier 5. The positive terminal of the operational amplifier 5 is connected to the reference power supply 7, which provides a reference voltage $V_{REF}$. The comparator 8 is connected to the junction between the negative terminal of the operational amplifier 5 and the integrating capacitor 2 and compares the potential of the junction and the reference voltage $V_{REF}$. The comparator 8 outputs a signal corresponding to the comparison result. The CPU 19 receives the signal output from the comparator 8 and controls the on-off operation of the switches 1, 3 and 6.

Figure 2:
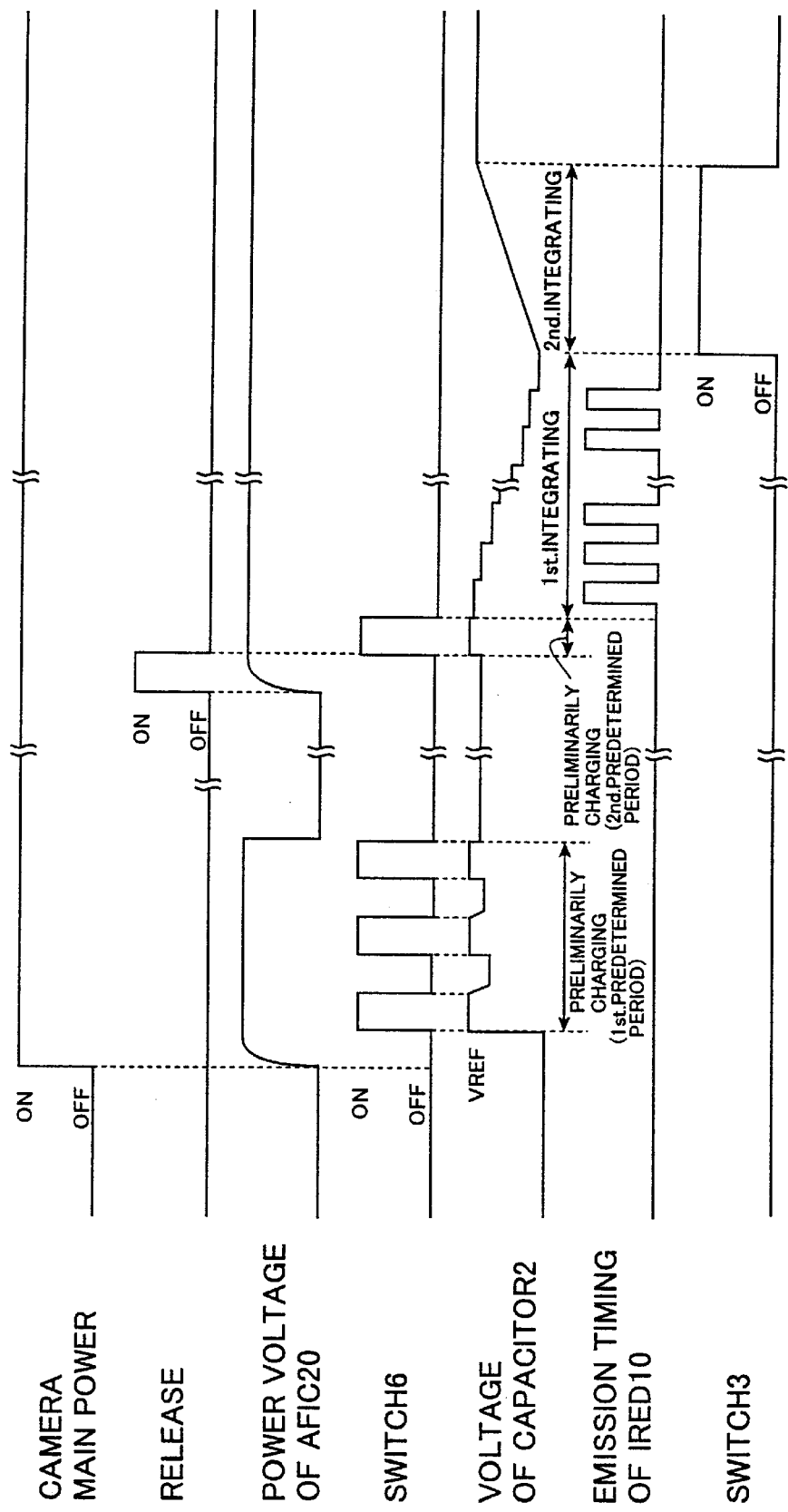
FIG. 2 is a view showing various timing charts for explaining the operation of the embodiment of FIG. 1.

The operation of the distance measurement system according to the aforementioned preferred embodiment would be explained referred with FIG. 2, which shows various timing charts relating to the operation of the distance measurement system according to the present embodiment. When the main power source of the camera is powered on, the supply of the power source voltage to the AFIC 20 starts. The integrating capacitor 2 is charged during a predetermined period (first predetermined period) after the main power power-on. This charging is carried out whenever the switch 6 is turned on by the control signal output from the CPU 19. Thus, the integrating capacitor 2 is charged until its potential reaches to the reference voltage $V_{REF}$ provided by the reference power source 7. Hereafter, such a charging is called as a preliminarily charging. In the present embodiment, the preliminarily charging is carried out, e.g., three times.

Then, a series of the distance measurement procedures starts if the shutter release button in the camera is half-depressed. At the start of the distance measurement procedures, the power source begins re-supplying the voltage to the AFIC 20 and the switch 6 is turned to on. Thus, the integrating capacitor 2 is preliminarily charged for a predetermined period (second predetermined period) during which the switch 6 is maintained on. After the completion of the preliminarily charging, the switch 6 is turned off.

After the preliminarily charging, the IRED 10 is driven by an emission timing signal having a duty ratio output from the CPU 19 to the driver 11 and emits the infrared light pulses at a predetermined frequency. The infrared pulses emitted from the IRED 10 are reflected by the object 30 and then the object-reflected pulses are received by the PSD 12. The arithmetic unit 15 outputs the data of output ratio $I_1/(I_1+I_2)$ for each pulse as a distance information signal. The distance information signals are transferred to the integrating unit 16. The CPU 19 controls the switch 1 in synchronous with the emission of pulses from the IRED 10. The distance information signals are input into the integrating capacitor 2 as negative voltage.

The capacitor 2 discharges by the voltage represented by each distance information signal. In other words, the voltage across the integrating capacitor 2 decreases step by step, as shown in FIG. 2, whenever receiving each distance information signal (first integrating). A voltage drop per each step may represent by itself distance information corresponding to a distance to the object 30.

After the integrating capacitor 2 has completed the discharging predetermined times, the switch 6 is maintained off and the switch 3 is turned on by the signal from the CPU 19. This causes the integrating capacitor 2 to be charged at a predetermined speed determined by the power rating of the constant current source 4 (second integrating).

During the period of the second integrating, the comparator 8 compares the voltage of the integrating capacitor 2 and the reference voltage $V_{REF}$ and when estimated that they are coincident with each other, causes the switch 3 to be turned off. This causes the charging of the integrating capacitor 2 to be stopped and the CPU 19 to commence determining a length of time required to perform the second integrating. As the charging speed by the constant current source 4 is uniform, the sum of the signal voltages input in the integrating capacitor 2 during one distance measurement can be obtained. That is, as the number of emissions is known, the average of the distance information signals or the average distance to the object 30 can be determined based on the sum.

Subsequently, the shutter release button is fully depressed and then the CPU 19 operates to control the lens drive unit 17 based on the determined distance so as to appropriately adjust the focus of the lens 18. Also, a shutter (not shown) opens causing exposure film to light. In this manner, the release operation can be followed by the aforementioned series of shooting procedures comprising preliminarily charging, distance measuring (first and second integrating), focussing and exposing. Subsequent shooting also can be performed in a similar manner.

Furthermore, the CPU 19 controls the operation of a not shown regulator, which is for a stable supply of the power source voltage to camera components (except the CPU 19 itself), so as to stop the power supply and to set in a standby mode if no manipulation of the camera is performed within a certain period (for example, 5 minutes) and so as to release the standby mode to restart the power supply if any manipulation is performed in the standby mode. The CPU 19 also preliminarily charges the integrating capacitor 2 when the standby mode is released (first predetermined period). The preliminarily charging at the release of the standby mode is also carried out e.g., three times as in the case of the preliminarily charging at the main power turn-on. After the preliminarily charging, the supply of power to the AFIC 20 stops and the switch 6 is turned off, thus stopping the preliminarily charging of the integrating capacitor 2.

Furthermore, the CPU 19 also operates to cause the integrating capacitor 2 to be preliminarily charged if some manipulations other than the shutter release button actuation are performed (first predetermined period). The preliminarily charging at this conjuncture is also carried out three times as in the case of the preliminarily charging at the main power turn-on. These manipulations other than the shutter release button actuation may include such as zooming in and out, setting of date, etc., and battery checking and so on.

Figure 3:
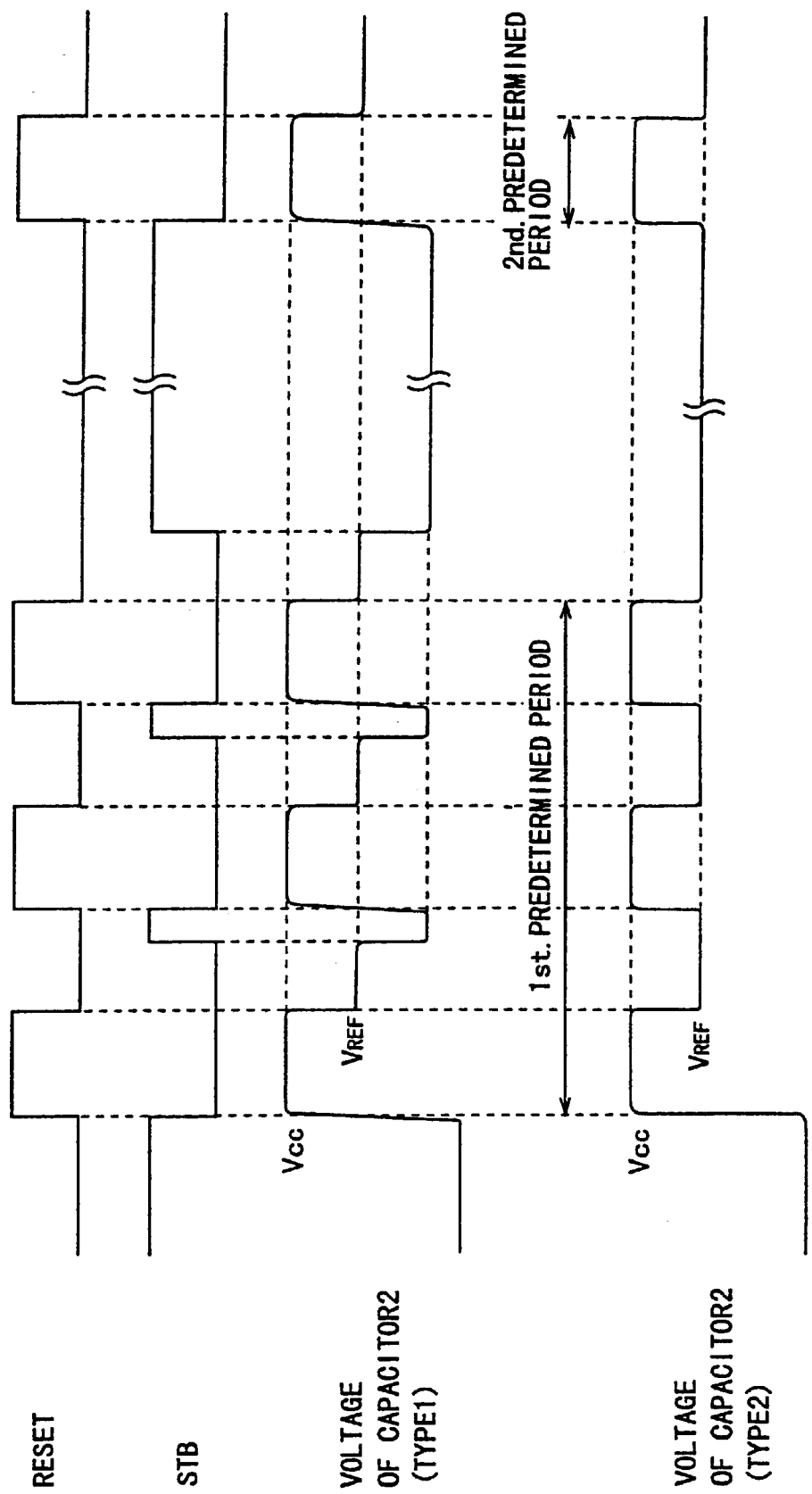
FIG. 3 is a view showing various timing charts for explaining a preliminarily charging in the embodiment of FIG. 1.

FIG. 3 shows various timing charts for explaining the preliminarily charge. Although the integrating capacitor 2 is charged to the reference voltage $V_{REF}$ in the timing charts shown in FIG. 2, it is charged to the power source voltage $V_{CC}$ in the timing charts shown in FIG. 3, which is higher than the reference voltage $V_{REF}$. In FIG. 3, a RESET signal is a signal to command the AFIC 20 to cause the integrating capacitor 2 to be charged to the power source voltage $V_{CC}$. A STB signal is a signal to command the AFIC 20 to cause the integrating capacitor 2 to be discharged.

First, the timing chart "TYPE 1" of FIG. 3 shows changes in voltage of the integrating capacitor 2 when the RESET signal and the STB signal are input into the AFIC 20. In this case, the integrating capacitor 2 is charged to the power source voltage VCC when the STB signal is in a low level and the RESET signal is in a high level and to the reference voltage VREF when the STB signal is in a low level and the RESET signal is too in a high level. However, the integrating capacitor 2 is discharged when the STB signal is high.

The timing chart "TYPE 2" of FIG. 3 shows changes in voltage of the integrating capacitor 2 when the RESET signal and the STB signal are input into the AFIC 20. The STB signal is always in a low level from the rising edge of the first RESET signal. In this case, the integrating capacitor 2 is charged to the power source voltage $V_{CC}$ when the RESET signal is in a high level and to the reference voltage $V_{REF}$ also when the RESET signal is in the high level.

Figure 4:
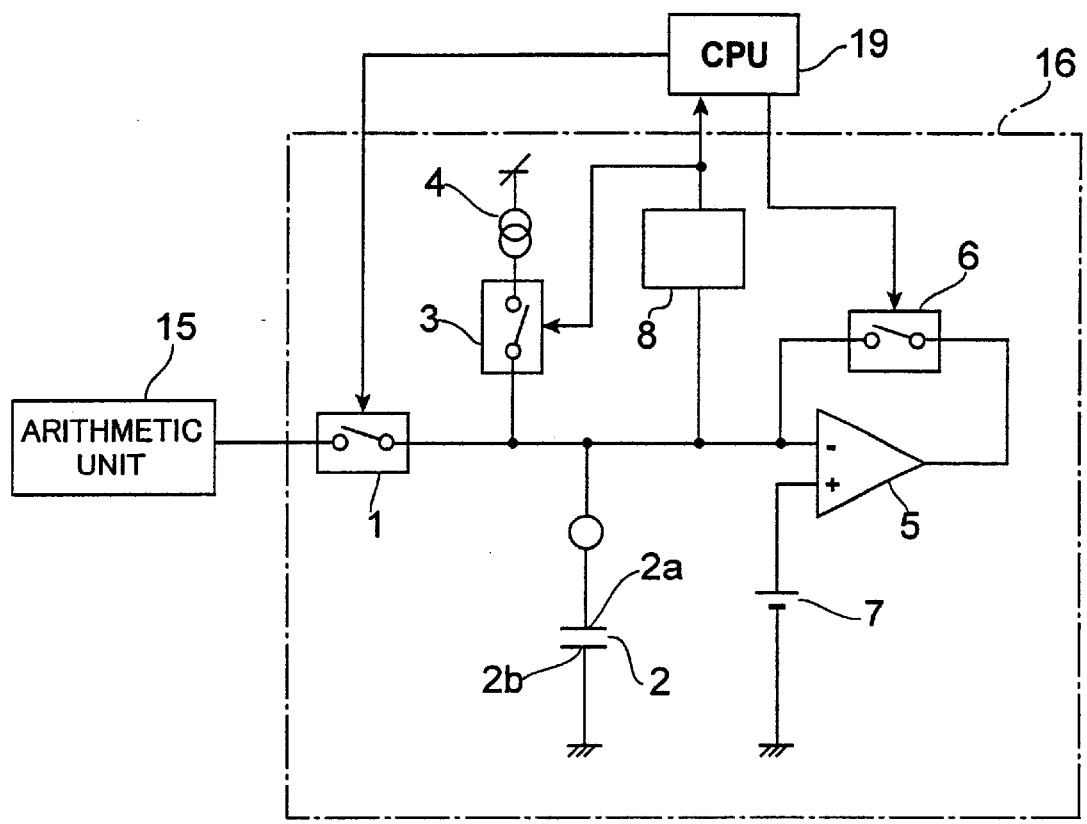
FIG. 4 is a diagram showing a conventional integrating unit in a prior distance measurement system.
Figure 5:
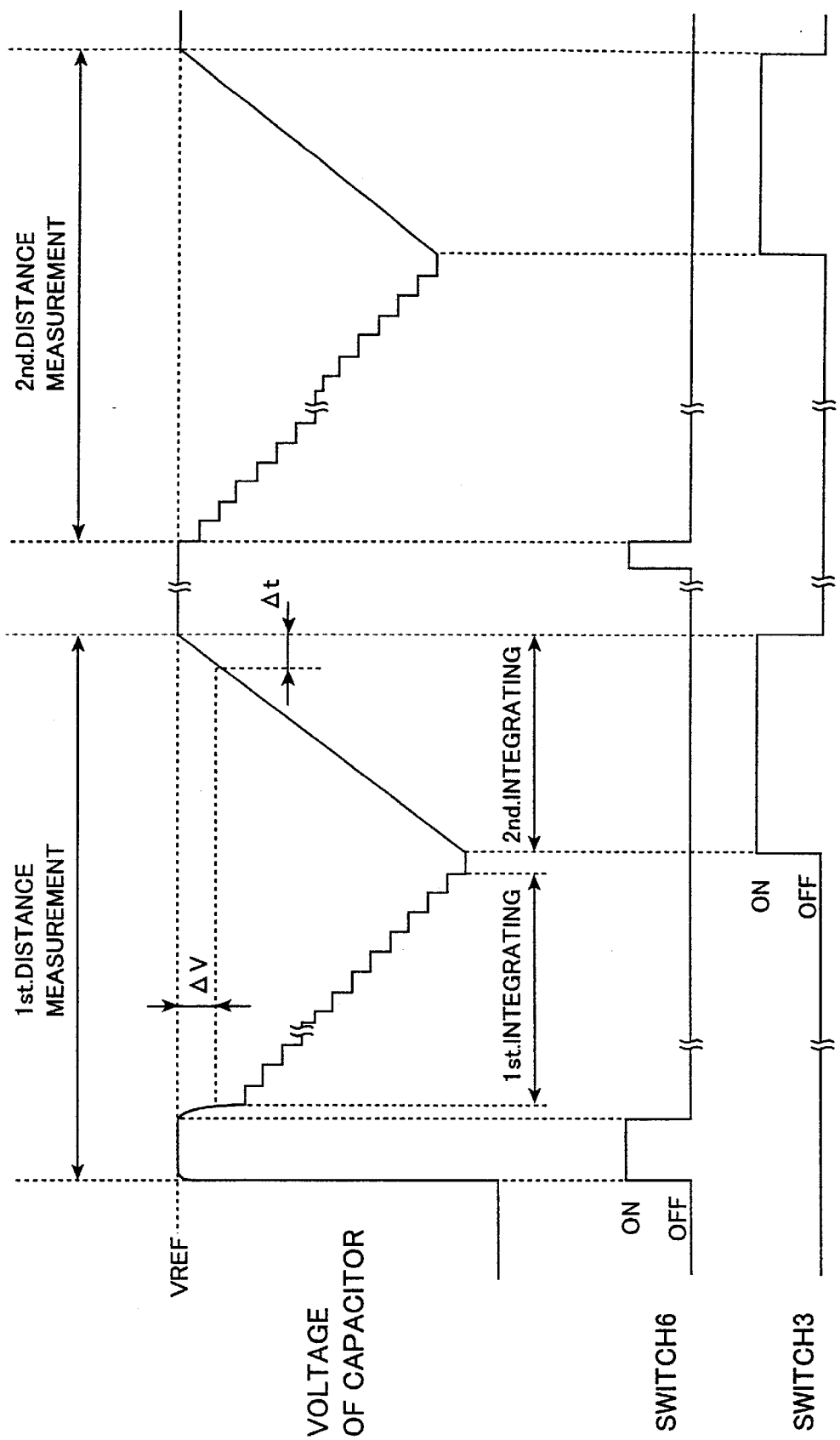
FIG. 5 is a view of timing charts showing changes in voltage with time of an integrating capacitor in the prior distance measurement system.
Figure 6:
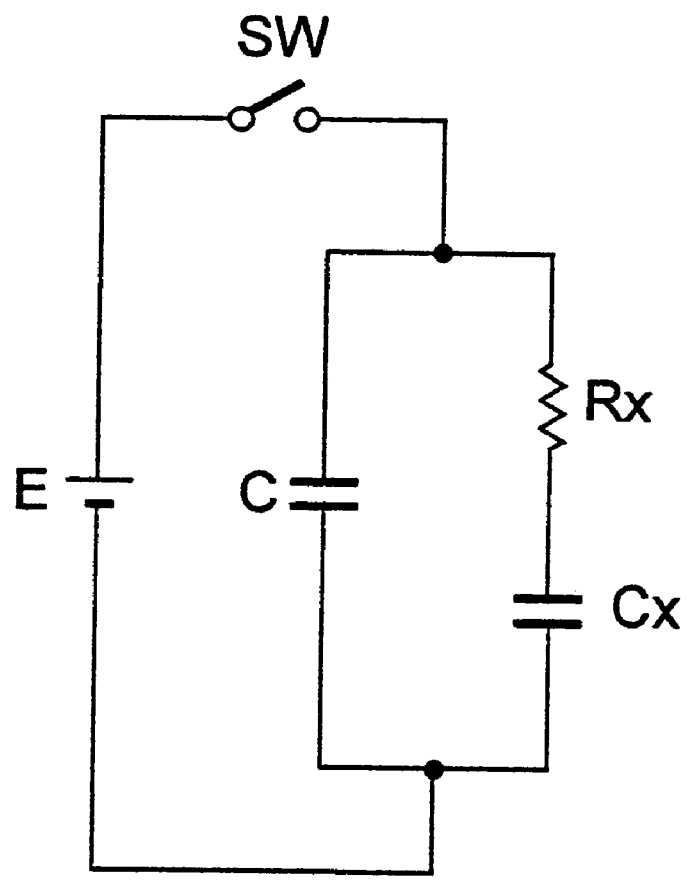
FIG. 6 shows an equivalent circuit for explaining dielectric absorption of a condenser.

In order to realize the charging of the integrating unit 2 to the power source voltage $V_{CC}$, a suitable switching means may be provided so that it is closed and opened by the RESET signal in such a position of FIG. 4 between the terminal 2a of the integrating capacitor 2 and a power voltage $V_{CC}$ terminal (not shown). By preliminarily charging the integrating capacitor 2 to the power source voltage $V_{CC}$ higher than the reference voltage $V_{REF}$ in this manner, a drop in voltage of the integrating capacitor 2 due to dielectric absorption may be further prevented.

It is understood from the foregoing that by preliminarily charging the integrating capacitor 2 at the manipulations (first predetermined period) other than the main power turn on, release of the standby mode, and operation of the shutter release button, the voltage drop due to the dielectric absorption is caused in the integrating capacitor 2 at the end of the preliminarily charging. This may prevent the occurrence of the voltage drop of the integrating capacitor 2 due to the dielectric absorption during the subsequent preliminarily charging at the start of the distance measurement. As a result, an error can be prevented from occurring in measured distance.

The present invention is not limited to the aforementioned embodiments and many modifications can be made thereto. For example, the invention is also applicable to a system including such an integrating unit, in which charging and discharging of an integrating capacitor are carried out in a manner contrary to that in the aforementioned embodiments. That is, during the period of the first integrating, the integrating capacitor 2 may be charged so that the voltage level thereof ascends step by step and then discharged at a time in the second integrating. The distance to the object is obtained on the basis of the time required for the second integrating in aforementioned embodiment, but it may also be obtained on the basis of the charged or discharged voltage of the integrating capacitor 2 after the first integrating with an A/D conversion.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An active distance measurement system comprising:

a light source for emitting a series of light pulses toward an object at a distance to be measured;

a position sensitive detector for detecting light pulses emitted from said light source and reflected from the object, and outputting signals, each signal corresponding to a position where the reflected light pulse is detected;

an arithmetic unit for outputting signals, each signal corresponding to the distance to the object, in response to the signals output from said position sensitive detector;

an integrating capacitor set to a first reference voltage before emission of the series of light pulses, said integrating capacitor being charged and discharged in response to signals output from said arithmetic unit;

a distance detection unit for detecting the distance to the object based on a voltage of said integrating capacitor present after emission of the series of light pulses; and a charger for preliminarily charging and discharging said integrating capacitor to at least the reference voltage at least twice in a first period, before any distance measurement, and preliminarily charging and discharging said integrating capacitor to the reference voltage in a second period, immediately before charging and discharging of said integrating capacitor in a distance measurement.

2. The distance measurement system according to claim 1, wherein the first period includes a period after a main power source power-on.

3. The distance measurement system according to claim 1, comprising a power control unit stopping supply of power and setting a standby mode if no manipulation is performed within a certain period, and restarting the supply of power and releasing the standby mode if any manipulation is performed during the standby mode, wherein the first period includes a period of time immediately after releasing of the standby mode.

4. The distance measurement system according to claim 1, wherein said distance measurement system is mounted in a camera and the first period includes a period during which a component, other than a release button of the camera, is manipulated.

5. The distance measurement system according to claim 1, wherein the first period is longer than the second period.

* * * * *